US012403068B1

(12) United States Patent
Hillyard

(10) Patent No.: US 12,403,068 B1
(45) Date of Patent: Sep. 2, 2025

(54) COMMON ESCUTCHEON BASE

(71) Applicant: Waterway Plastics, Oxnard, CA (US)

(72) Inventor: Jason Hillyard, Oxnard, CA (US)

( * ) Notice: Subject to any disclaimer, the term of this patent is extended or adjusted under 35 U.S.C. 154(b) by 273 days.

(21) Appl. No.: 17/941,572

(22) Filed: Sep. 9, 2022

(51) Int. Cl.
*A61H 33/00* (2006.01)

(52) U.S. Cl.
CPC ................................ *A61H 33/6063* (2013.01)

(58) Field of Classification Search
CPC ....... E03C 1/24; E03C 1/244; A61H 33/6094; A61H 33/6063
See application file for complete search history.

(56) References Cited

U.S. PATENT DOCUMENTS

| | | | | |
|---|---|---|---|---|
| 5,025,509 A * | 6/1991 | Holt | E03C 1/24 4/694 |
| 6,618,875 B1 * | 9/2003 | Oropallo | E03C 1/24 4/694 |
| D757,891 S | 5/2016 | Walker et al. | |
| D757,892 S | 5/2016 | Walker et al. | |
| D757,893 S | 5/2016 | Walker et al. | |
| D788,994 S * | 6/2017 | Walker | D29/122 |
| 9,849,064 B2 | 12/2017 | Walker et al. | |
| 10,544,572 B2 * | 1/2020 | Humber | E03C 1/244 |
| 11,466,439 B1 * | 10/2022 | Kuo | E03C 1/244 |
| 2008/0209626 A1 * | 9/2008 | Thiel | A61H 33/6042 4/507 |
| 2025/0052044 A1 * | 2/2025 | Kuo | E03C 1/244 |

* cited by examiner

*Primary Examiner* — Erin Deery
(74) *Attorney, Agent, or Firm* — Sandy Lipkin

(57) ABSTRACT

A system and method for building an escutcheon base that has a large number of variety of looks depending on the covers and/or rings attached thereto. The covers and accent components are selectable for installation on the common escutcheon base through a plurality of attachment points. The covers and accent components can have different aesthetic features, such as color and design, as well as be made from a variety of materials, specifically plastic and metal.

17 Claims, 18 Drawing Sheets

-Prior Art-

-Prior Art-

COMMON ESCUTCHEON BASE

BACKGROUND OF THE INVENTION

Field of the Invention

The field of this invention relates generally to the field of bath and spa fixtures and more particularly toward an apparatus and system of use thereof that provides for an escutcheon base to cover apertures in baths and spas that allows for the selection of various aesthetic coverings to a common base.

Description of the Prior Art

An escutcheon is used in the field of baths and spas and other scenarios where there is plumbing and an exposed aperture that is desirable to be covered to achieve a more refined look.

An escutcheon is a cover that is use to conceal a spa wall fitting and/or body flange along with internal components of a hydrotherapy jet from view and contact from the water side of the spa or pool wall. An entire part can be injection molded. A more complex part could be molded using a complex injection mold that requires slides and/or lifters. A complex mold requiring slides and/or lifters may include interchangeable inserts to mold various designs on the contactable surface of the escutcheon, but handling of the mold to change the inserts may lead to damage and shorten the life of the injection mold. An escutcheon has a contact surface, which is the portion of the escutcheon located outside of the wall fitting and/or jet body. The function of the escutcheon is for it to be used as a finished surface that is intended to be contacted by the bather, i.e., a person inside of the spa. The escutcheon may be used by the bather to grip and rotate the jet to control or vary the flow of water through the jet between fully on, partially on, and fully off. The escutcheon prevents the unintentional contact of the nozzle (i.e. directional or spinning eyeball, etc.) by the bather by keeping the bather's back away from the nozzle during the hydrotherapy massage.

An escutcheon has an outer diameter larger than flange of fitting, and it sits on the water side of the spa or pool wall with the fitting flange located therebetween. The outer boundary is the largest diameter forward located forward of the water side of the spa wall. When the escutcheon is not circular, this outer diameter would be defined as the outermost perimeter. The inner boundary of the escutcheon is located outside of the inner bore of the escutcheon in the direction away from a central axis of the jet assembly and spa wall hole. The inner diameter surrounds the water nozzle exit from the hydrotherapy jet and is approximately 50% (varying widely between 25%-75%) of the outer diameter located forward of the water side of the spa wall.

Two or more sets of concentric apertures allow clip features of a cover to extend from the front side of the escutcheon base to the back side of the escutcheon to thereby allow a portion of the clip called a contacting surface to contact an adjacent contact point/attachment point of an escutcheon base to retain the cover to the escutcheon base. The two or more sets of concentric apertures are located on the escutcheon base forward of the water side of the spa wall and within the outer and inner boundary of the escutcheon contact surface being concentric about the central axis of the hydrotherapy jet and the hole in spa wall. The attachment point/concentric connection points function to retain a cover to the escutcheon base. They are on the escutcheon base forward of the water side of the spa wall between the outer and inner boundary of the escutcheon contact surface and adjacent to an aperture of the two or more sets of concentric apertures.

Escutcheons, therefore, can come in a variety of looks. In the art, a common escutcheon base has been used to assemble up to three different plastic cover looks that are attached to the front of a common escutcheon base at a common diameter.

Another method is to snap various rings behind escutcheons. These rings and rings with extruded shapes are intended to fill windows in the escutcheon to create contrast and complete the desired look. In these types of prior with rings without extruded shapes, i.e., those rings that are snapped behind escutcheons, there would be one ring in various colors of plastic and/or one ring in formed stainless steel that fits various escutcheon designs.

Escutcheon tooling is complicated and expensive. The cover tooling is simpler than the escutcheon tooling and less expensive. It is the object of the instant invention to provide an apparatus and system of creating variable escutcheon looks using a common escutcheon base that is simpler and less expensive than current methods.

SUMMARY OF THE INVENTION

The basic embodiment of the present invention teaches a system that provides for the selection of appearances for the inside of a pool or spa wall comprising: a fitting that fits into an aperture on the interior wall of a spa or pool; an escutcheon base that is arcuate with a certain diameter for attachment to said fitting, said escutcheon base further comprising: two or more concentric members; and two or more apertures situated along said two or more concentric members wherein said two or more concentric members and said two or more apertures provide multiple and variable attachment points on said escutcheon base; a selection of plastic covers that are attachable to said variable attachment points; and a selection of accent components that are capturable between one of said selection of covers and said escutcheon base wherein a cover or a cover and an accent component is chosen for attachment to said escutcheon base to thereby provide a specific aesthetic appearance on the inside of said pool or spa wall that is changeable as desired.

The above embodiment can be further modified by defining that said selection of accent components includes accent components made of plastic.

The above embodiment can be further modified by defining that said selection of accent components includes accent components made of metal.

The above embodiment can be further modified by defining that the fitting is a hydrotherapy jet.

The above embodiment can be further modified by defining that said cover is moldable from an injection mold that does not require slides or lifters.

An alternate embodiment of the instant inventions teaches a system that provides for the selection of appearances for the inside of a pool or spa wall comprising: a fitting that fits into an aperture on the interior wall of a spa or pool; an escutcheon base that is arcuate with a certain diameter for attachment to said fitting, said escutcheon base further comprising: two or more concentric members; and two or more apertures situated along said two or more concentric members wherein said two or more concentric members and said two or more apertures provide multiple and variable attachment points on said escutcheon base; wherein a cover is chosen for attachment to said escutcheon base to thereby provide a specific look on the inside of said pool or spa wall.

The above embodiment can be further modified by defining that a selection of plastic covers that are attachable to said variable attachment points and a selection of accent components that are capturable between one of said selection of covers and said escutcheon base.

The above embodiment can be further modified by defining that said fitting is a hydrotherapy jet.

The above embodiment can be further modified by defining that said cover is moldable from an injection mold that does not require slides or lifters.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
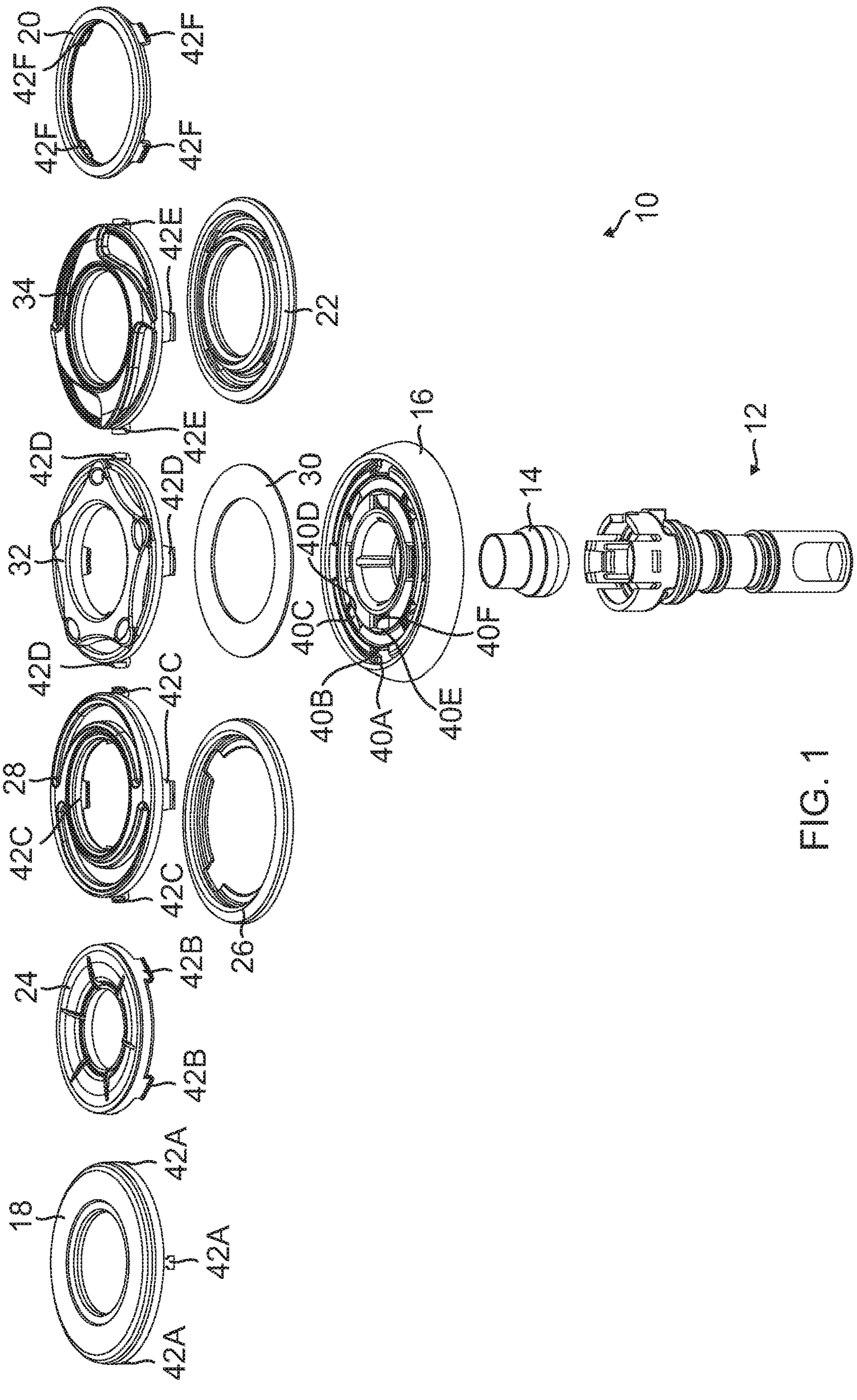
FIG. 1 is an exploded view of a spa fitting with a common escutcheon base showing the possible covers and accent components to be used thereon.

Turning to the drawings, the preferred embodiment is illustrated and described by reference characters that denote similar elements throughout the several views of the instant invention.

The preferred embodiment of the instant invention provides for an apparatus that is composed primarily of a common escutcheon base 16 that can be used to create a large variety of selectable looks using a variety of covers, made of plastic, and accent components, also made of plastic or metal, all of which are designed to snap over the common escutcheon base 16. A single common escutcheon base 16, depending on its diameter, can allow for a large number of variable looks. For example, a two-inch diameter escutcheon base can have four connection point options for each concentric diameter. Any number of connection points can be used on any given diameter. The shape, quantity and repeat pattern of the connection points are variable.

An escutcheon base 16 with a larger diameter, for example, can have even more concentric connection diameters and thereby providing more potential varieties of looks in the assembly 10. The instant invention can utilize two or more plastic covers. An exemplary embodiment would be a hydrotherapy jet 12 with one of two or more plastic covers, each of the two or more plastic covers having a unique design, attached to the front of a common escutcheon base 16 wherein the plastic cover can use any of the multitude of attachment points included on the common escutcheon base 16. A look created this way can be additionally modified by the addition of metal and/or plastic accent components retained between the one of the two or more plastic covers and the common escutcheon base 16.

Figure 2:
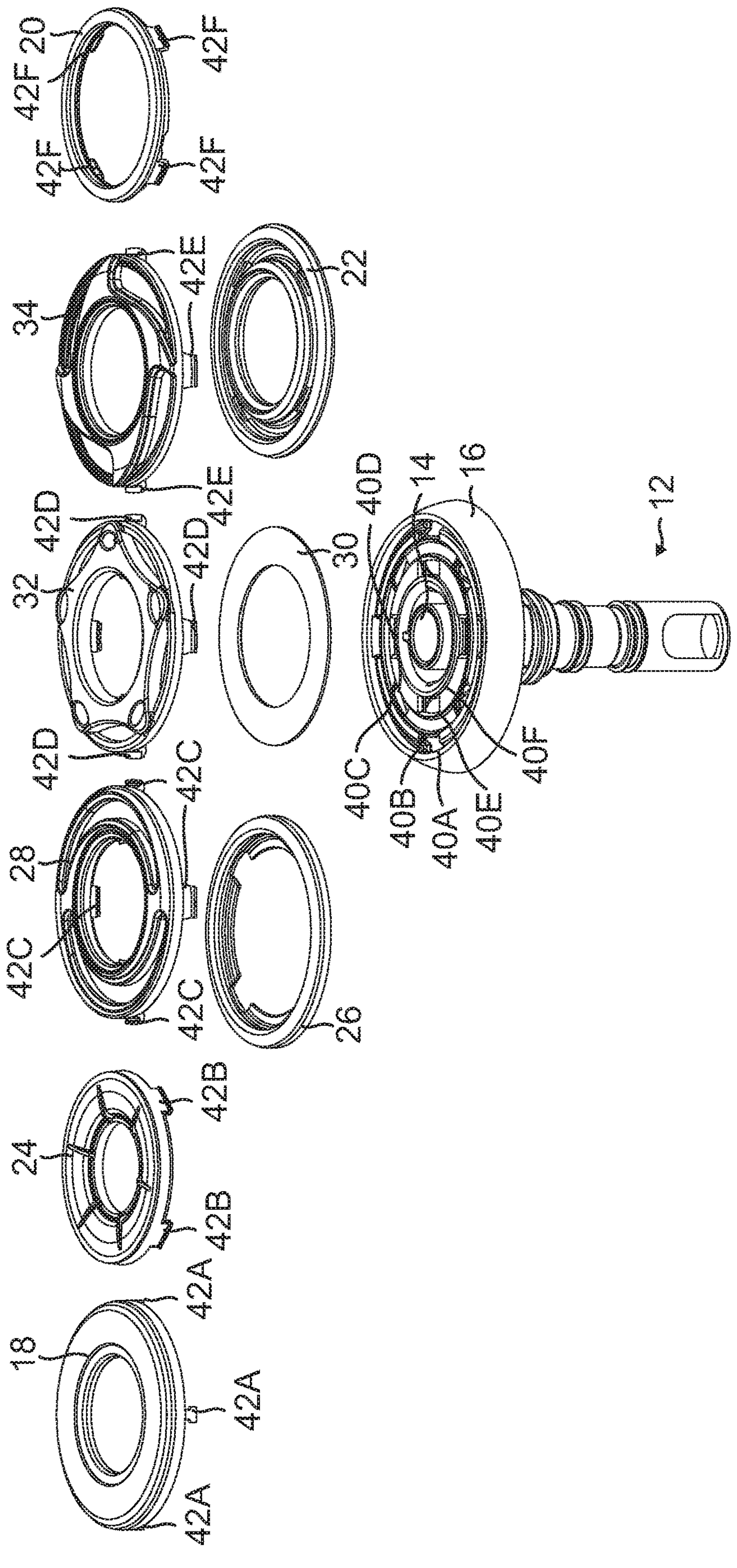
FIG. 2 is an unexploded view of the spa fitting shown in FIG. 1 showing the possible covers and accent components to be used thereon.
Figure 10:
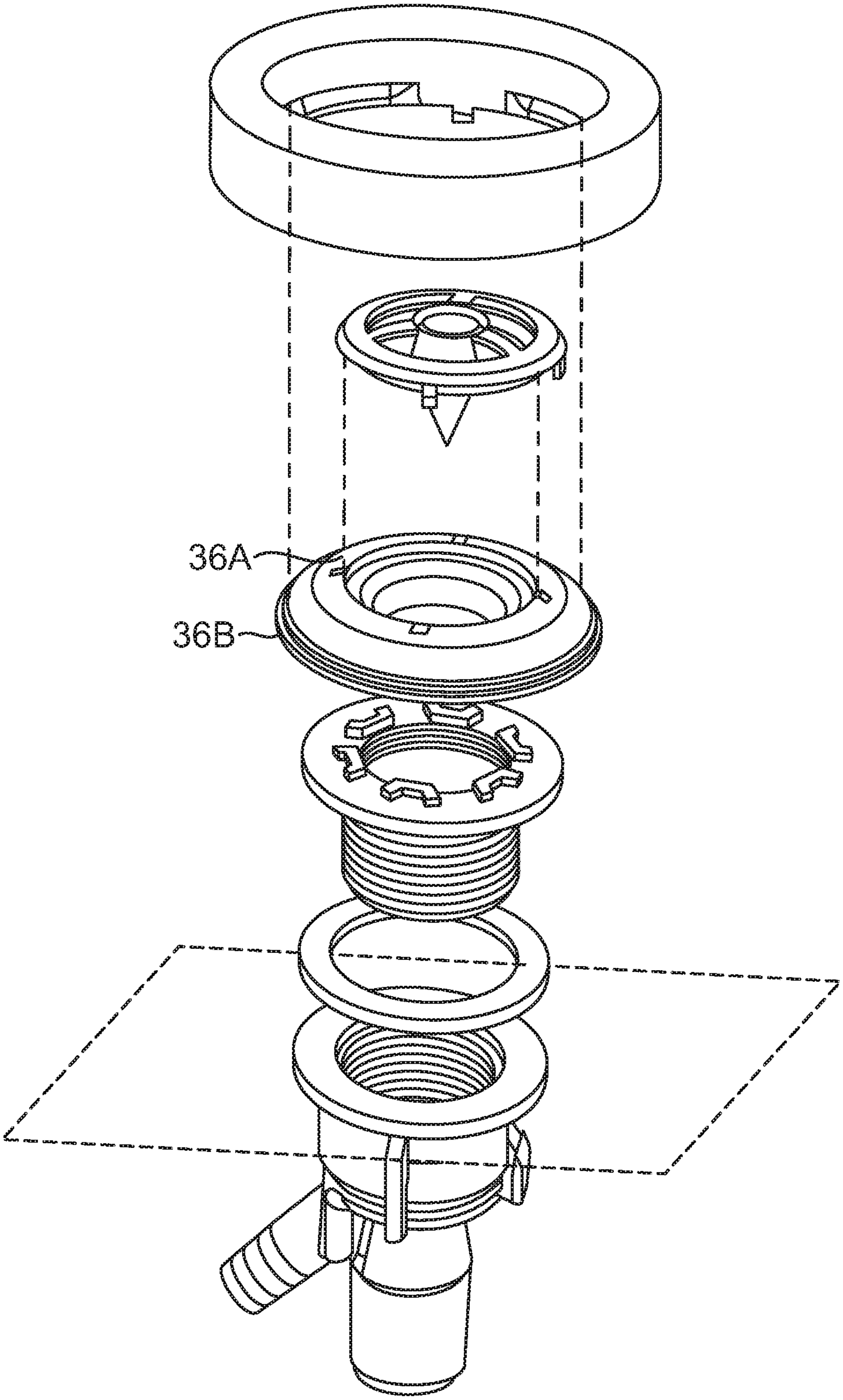
FIG. 10 is an exploded view of a prior art device showing just two concentric areas of attachment.
Figure 11:
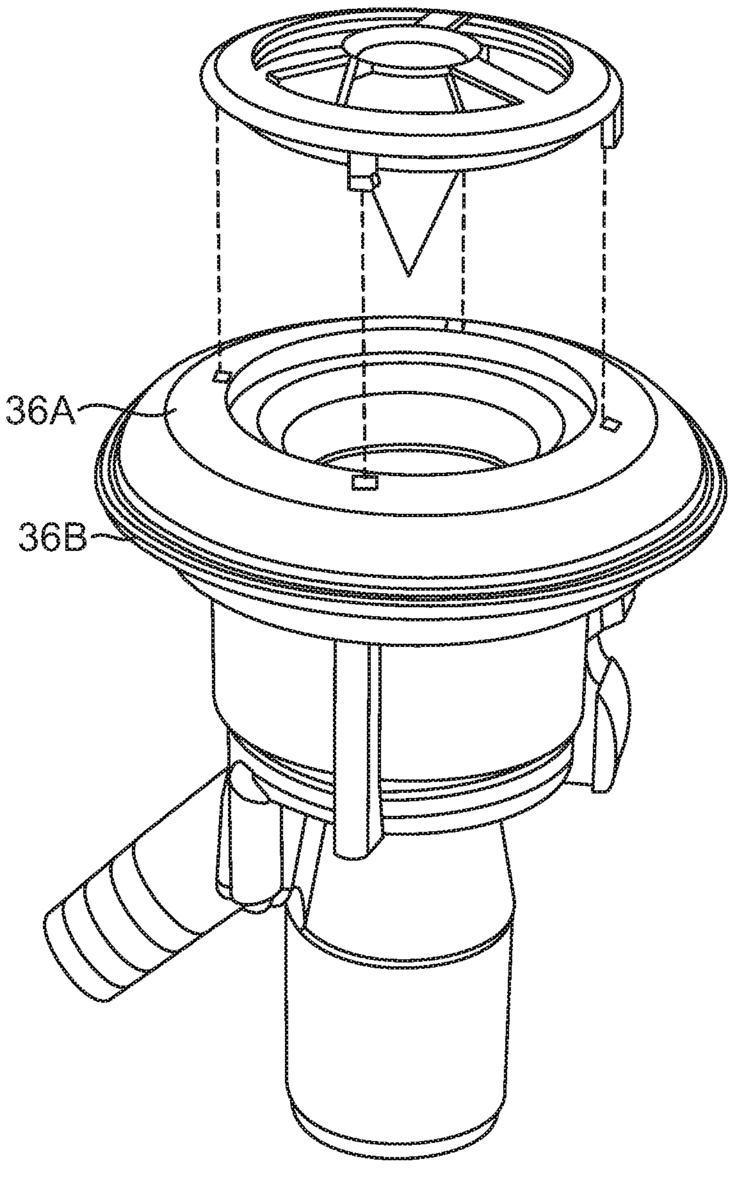
FIG. 11 is an unexploded view of the prior art device of FIG. 10.
Figure 12:
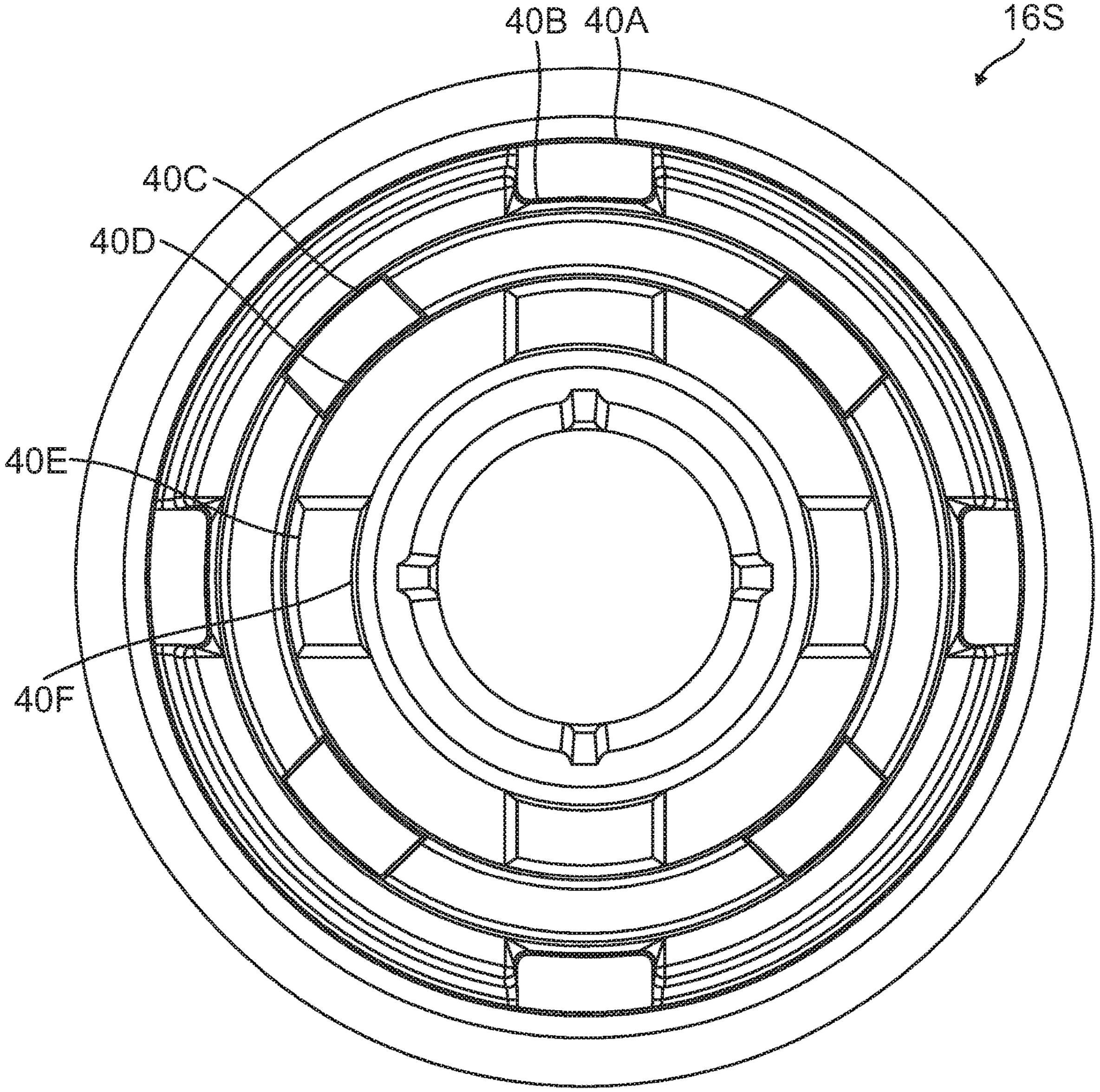
FIG. 12 is a top view of a small base version of the common escutcheon base of the instant invention without any covers or accent components.
Figure 13:
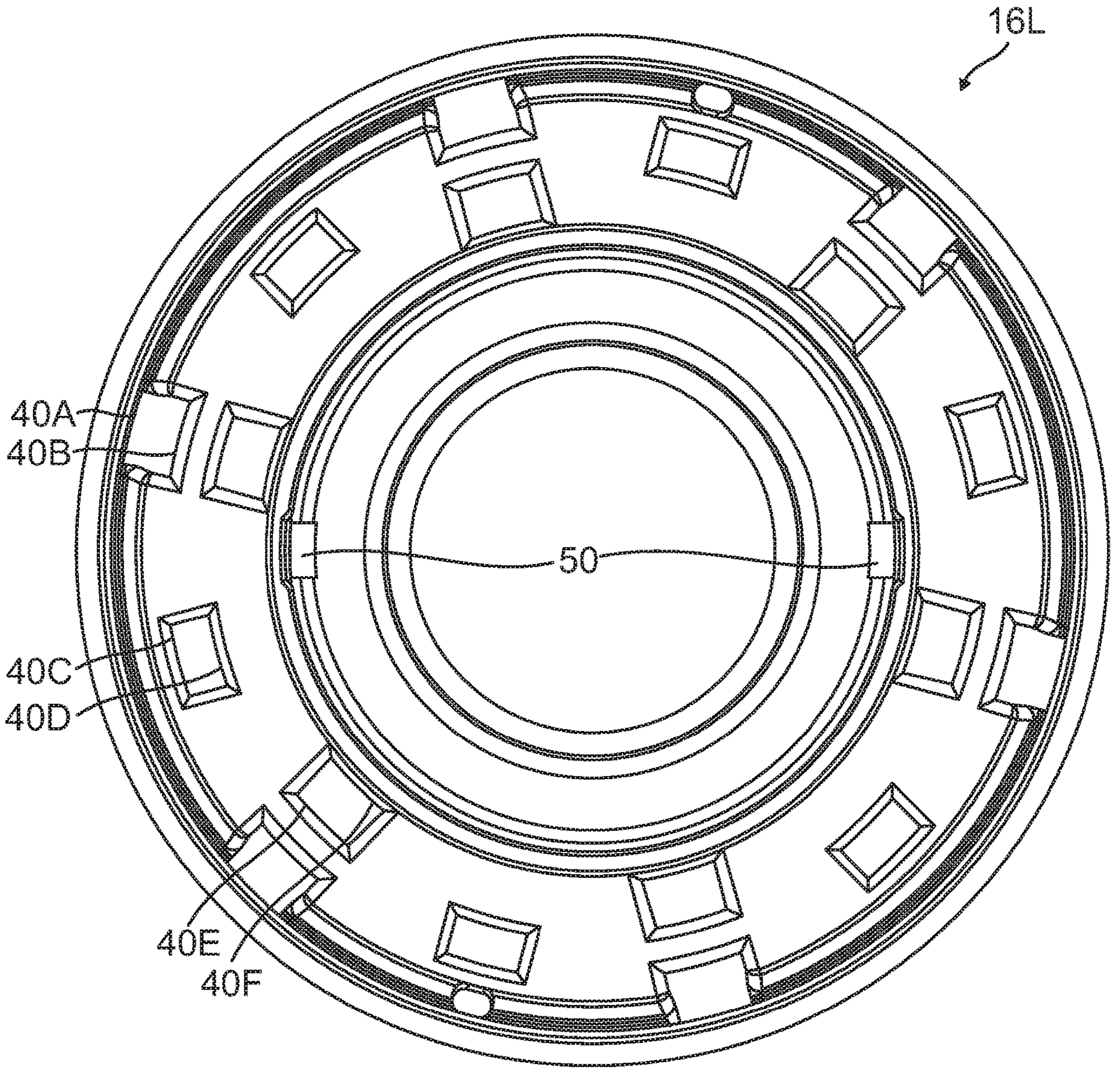
FIG. 13 is a top view of a large base version of the common escutcheon base of the instant invention without any covers or accent components.
Figure 14:
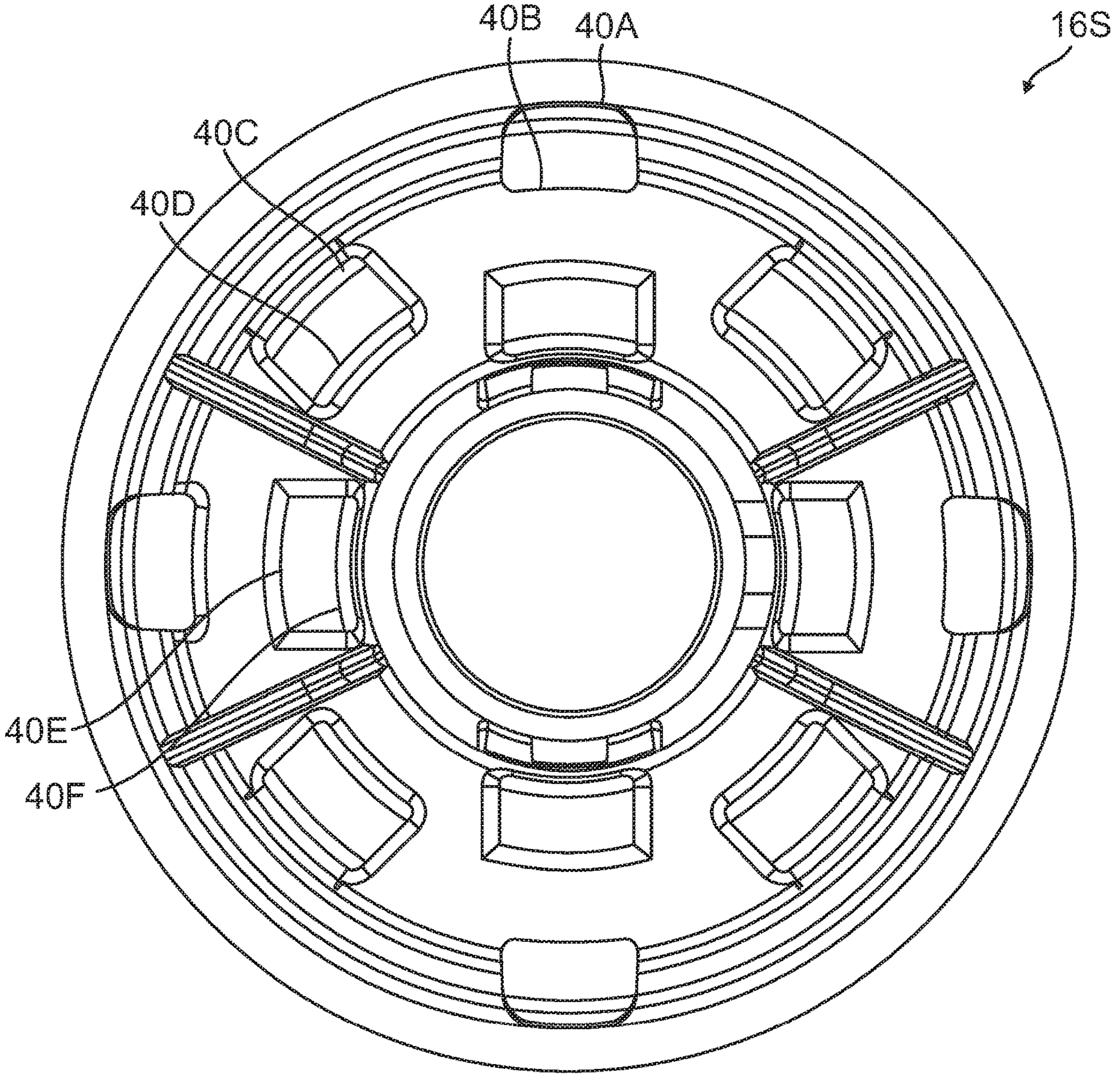
FIG. 14 is a bottom view of a small base version of the common escutcheon base of the instant invention.
Figure 15:
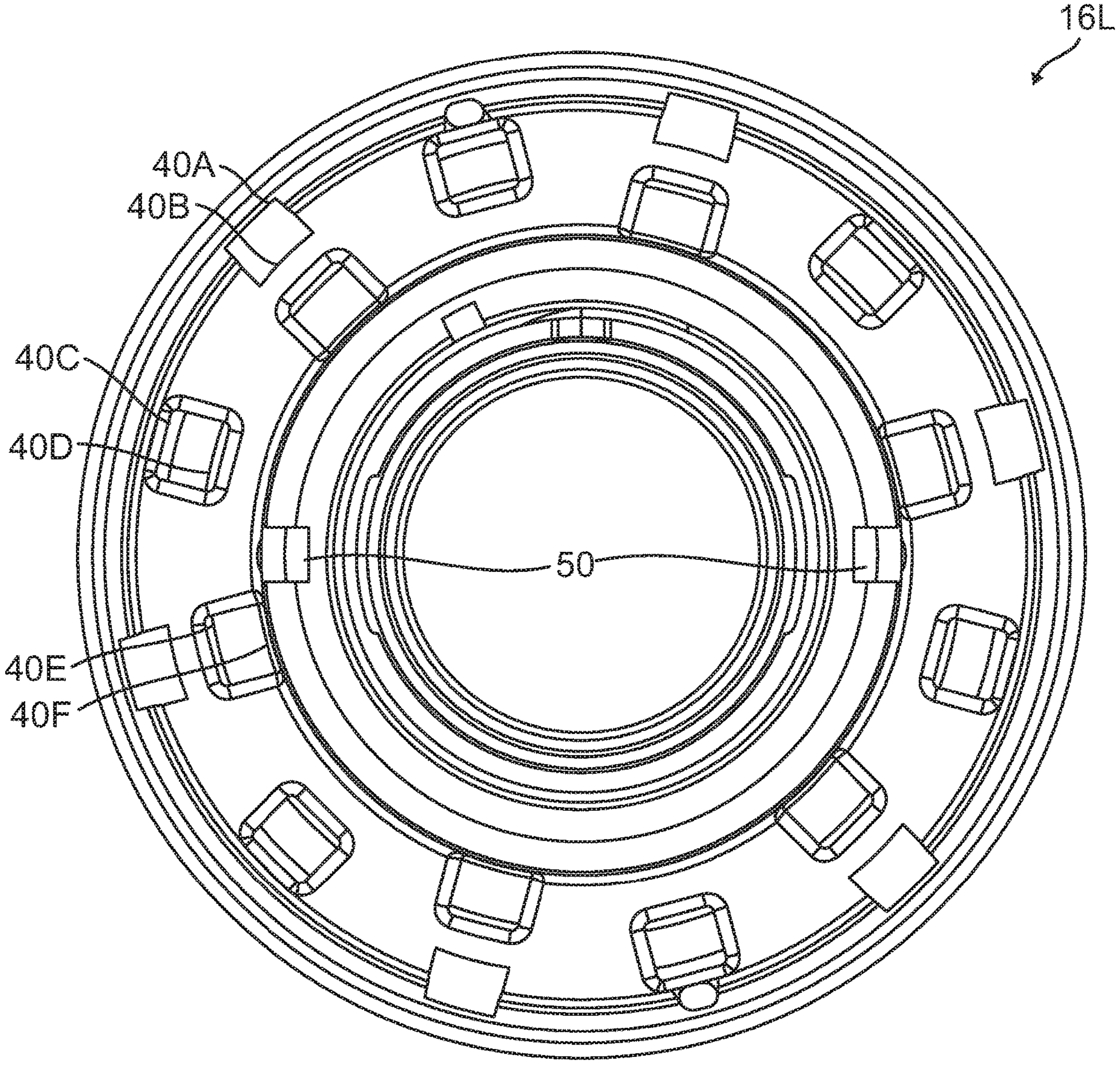
FIG. 15 is a bottom view of a large base version of the common escutcheon base of the instant invention.
Figure 16:
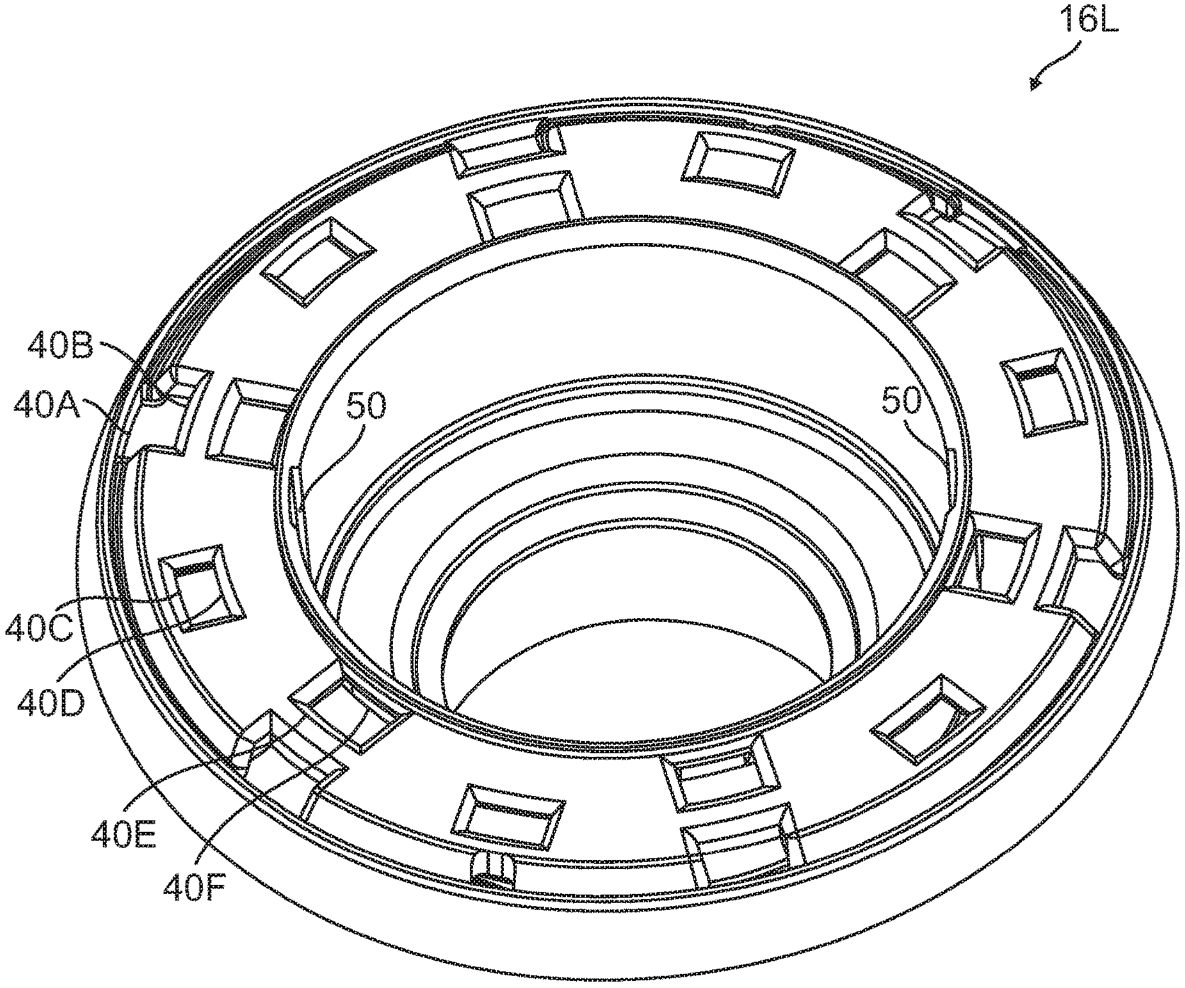
FIG. 16 is a top isometric view of the large base version of the common escutcheon base of the instant invention without any covers or accent components.
Figure 17:
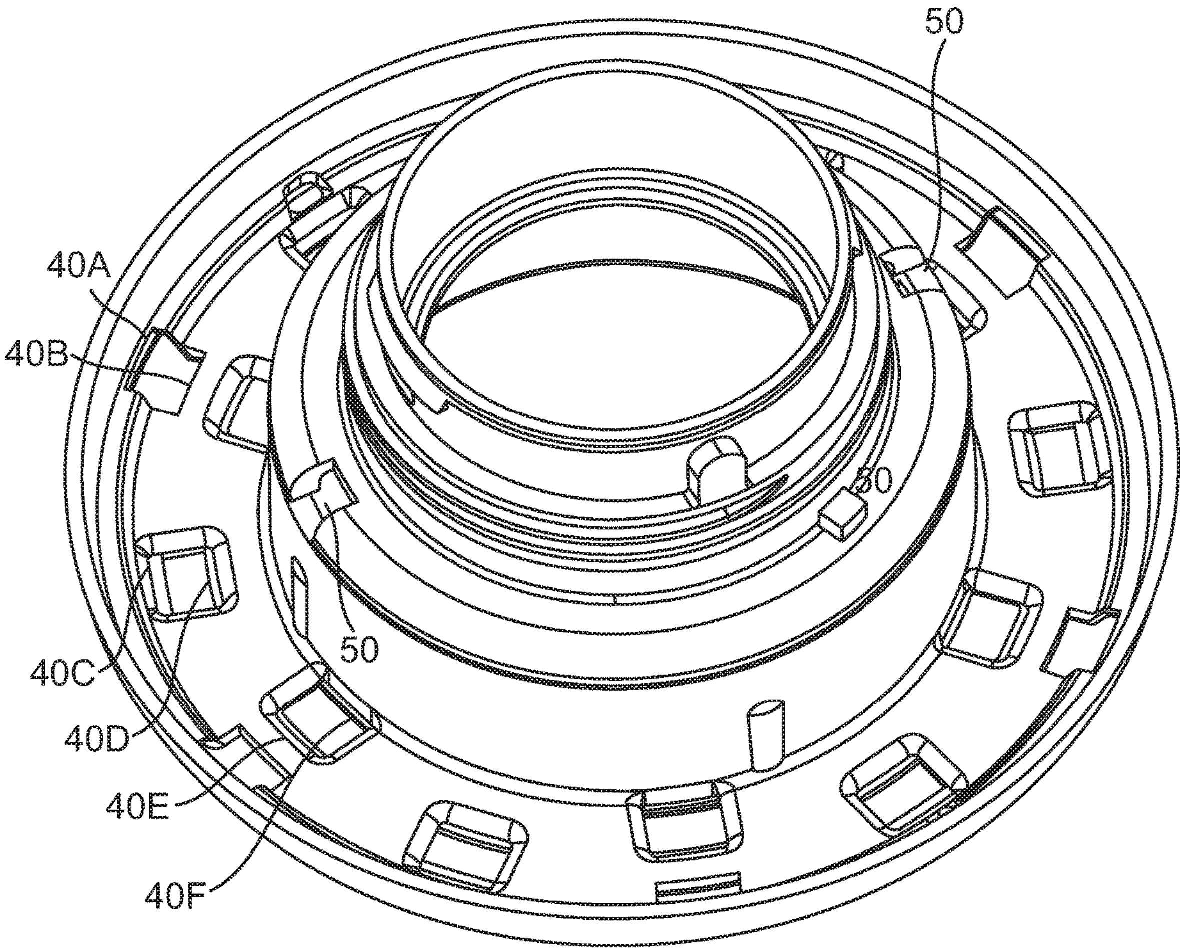
FIG. 17 is a bottom isometric view of the large base version of the common escutcheon base of the instant invention.

As can be seen in FIGS. 10-11 which illustrates a prior art device, the escutcheon base has two concentric areas 36A, 36B onto which the covers are attachable. The device 10 of the instant invention allows for a much larger potential number of concentric connection points on the escutcheon base 16. The escutcheon base 16 of the instant invention is shown in the center of the exploded view of FIG. 1. Beneath the escutcheon base 16 is an assembly for a spa fitting 12, which, as illustrated, is a diffuser, but could be any fitting, and includes a directional eyeball 14 but could also be a spinning eyeball or other hydrotherapy outlet nozzle. As illustrated in FIG. 1, there are three accent components 26, 30, 22 illustrated and six different covers 18, 24, 28, 32, 34, 20. FIG. 2 is the same view as FIG. 1 but the fitting 12 is no longer exploded and it can be seen where the accent components 36, 30, 22 and covers 18, 24, 28, 32, 34, 20 could potentially attach. The attachment points are noted as 40A, 40B, 40C, 40D, 40E, 40F with associated attachment clips 42A, 42B, 42C, 42D, 42E, 42F.

Figure 3:
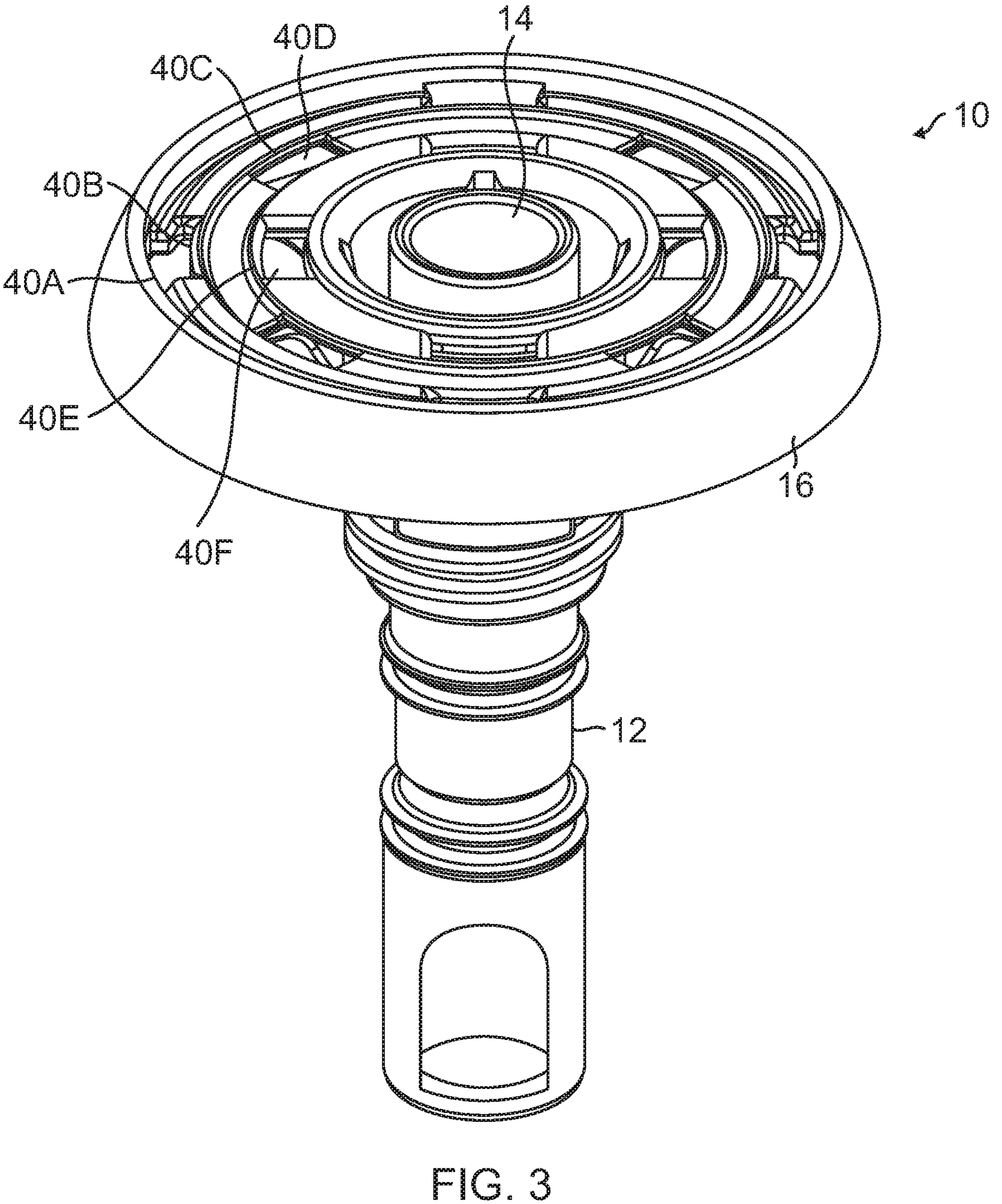
FIG. 3 is an unexploded view of the spa fitting shown in FIG. 2 but without the array of accent components and covers to be attached thereto.
Figure 4:
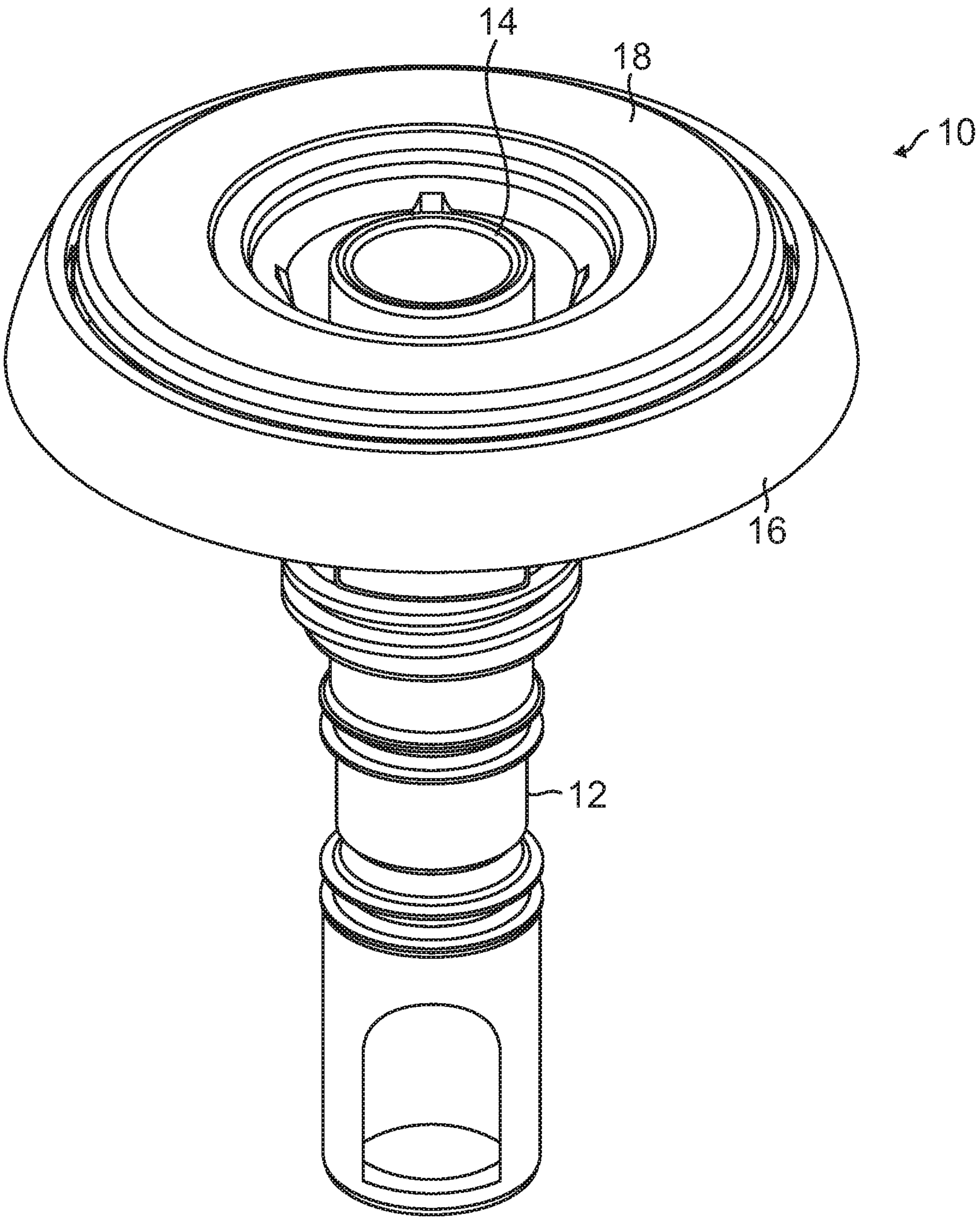
FIG. 4 is an unexploded view of the spa fitting shown in FIG. 2 with an exemplary plastic cover without an accent component affixed to the common escutcheon base.
Figure 5:
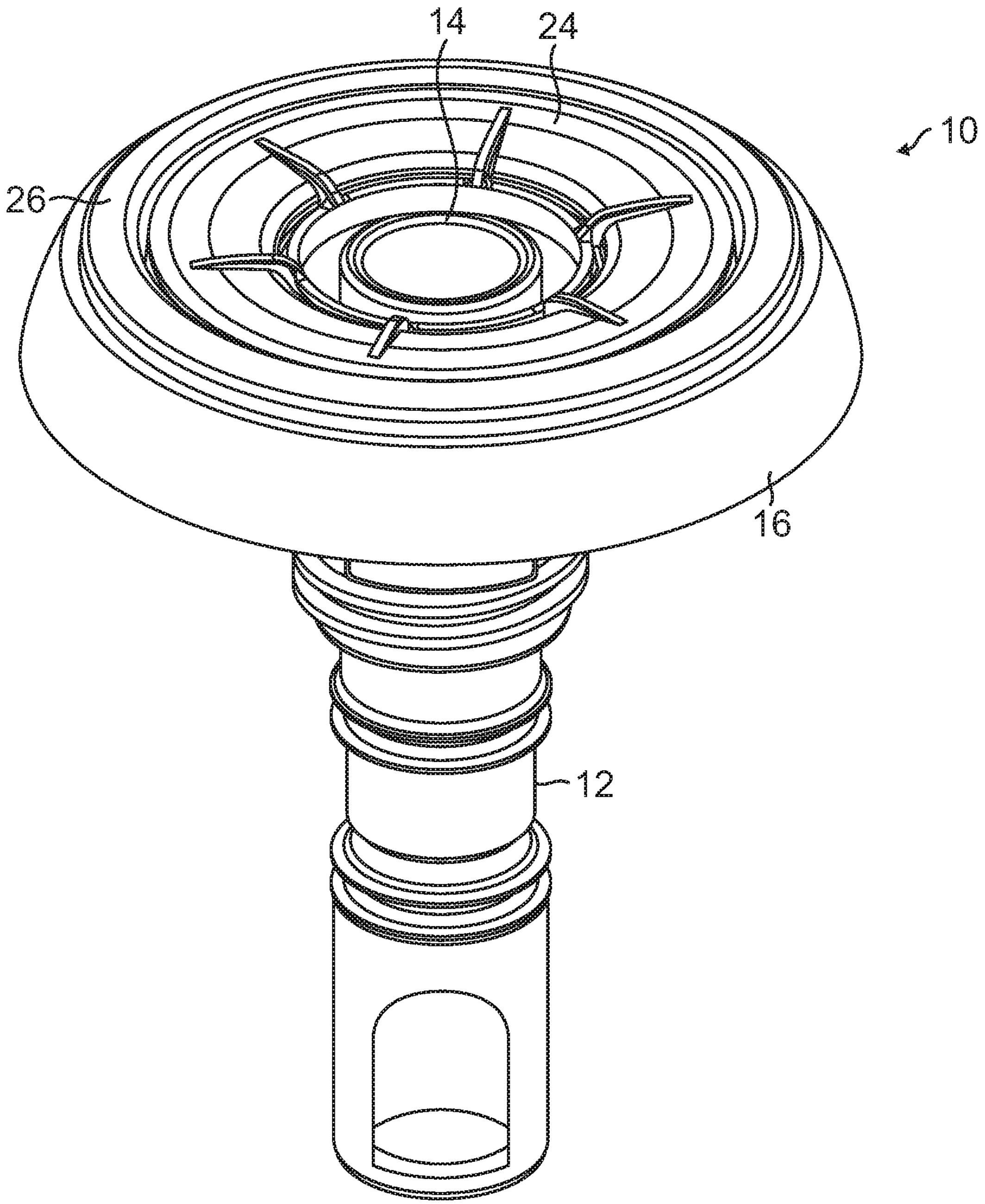
FIG. 5 is an unexploded view of the spa fitting shown in FIG. 2 with a plastic cover and metal accent component attached to the common escutcheon base.
Figure 6:
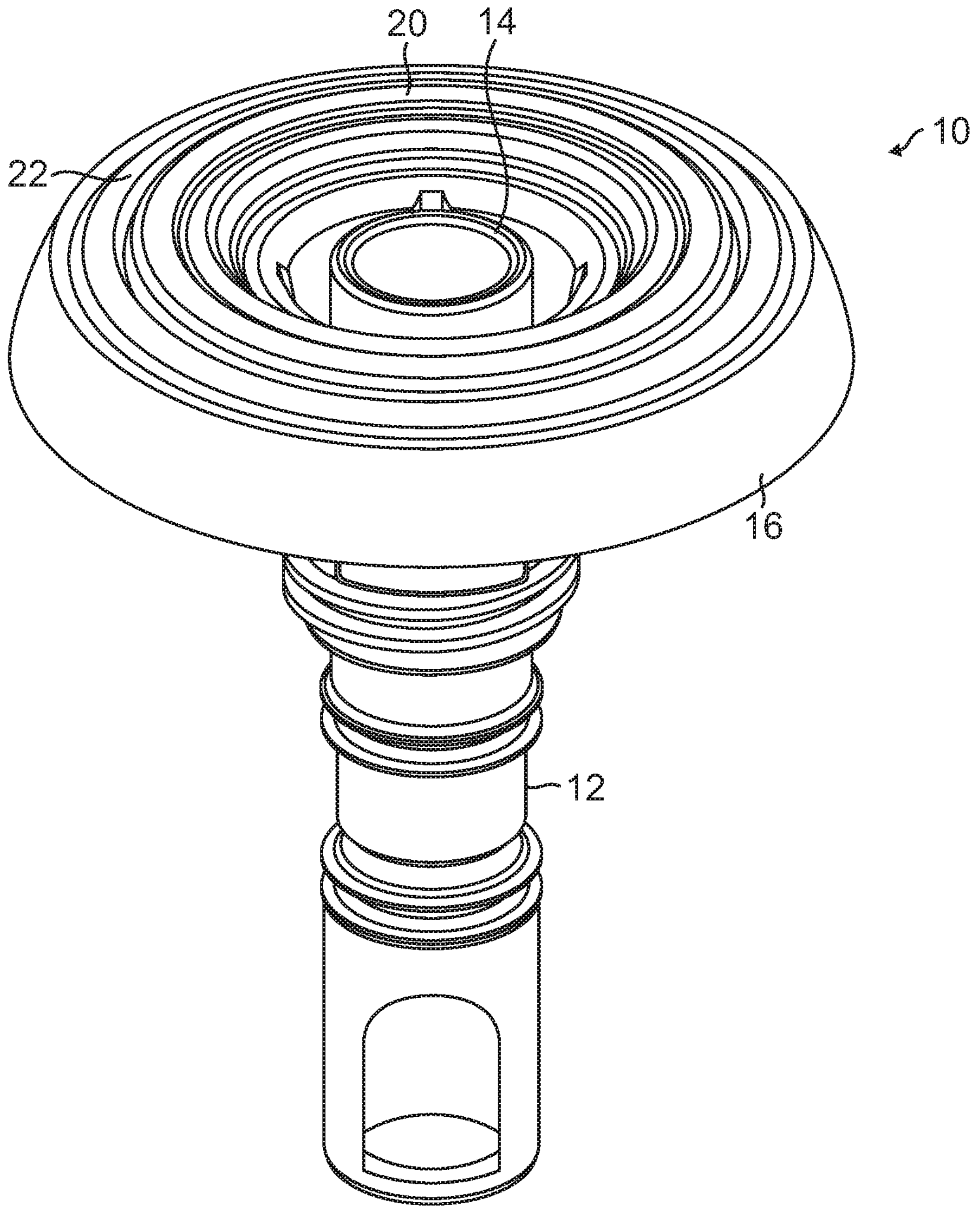
FIG. 6 is an unexploded view of the spa fitting shown in FIG. 5 with a different style of plastic cover.
Figure 7:
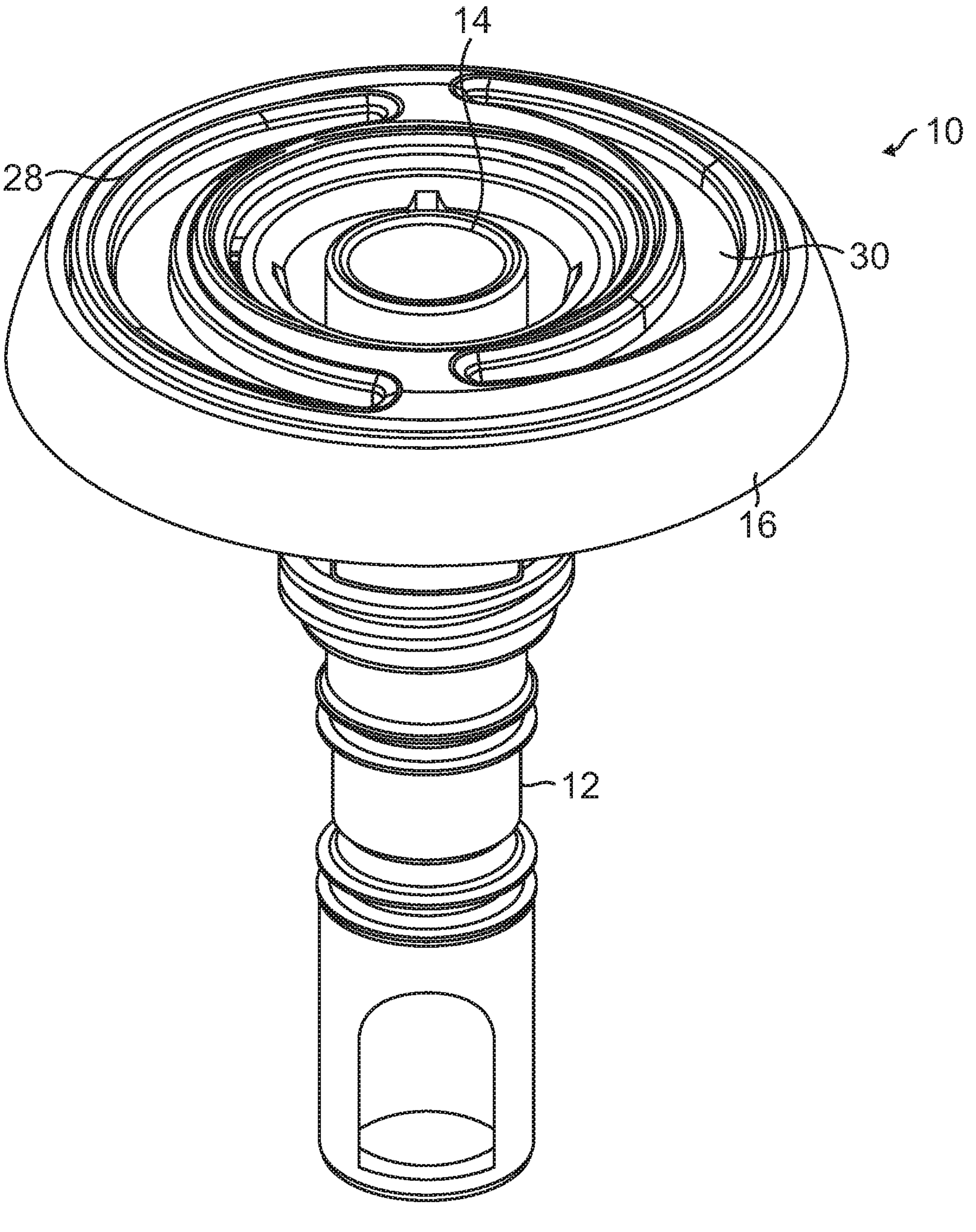
FIG. 7 is an unexploded view of the spa fitting shown in FIG. 5 with a different style of plastic cover.
Figure 8:
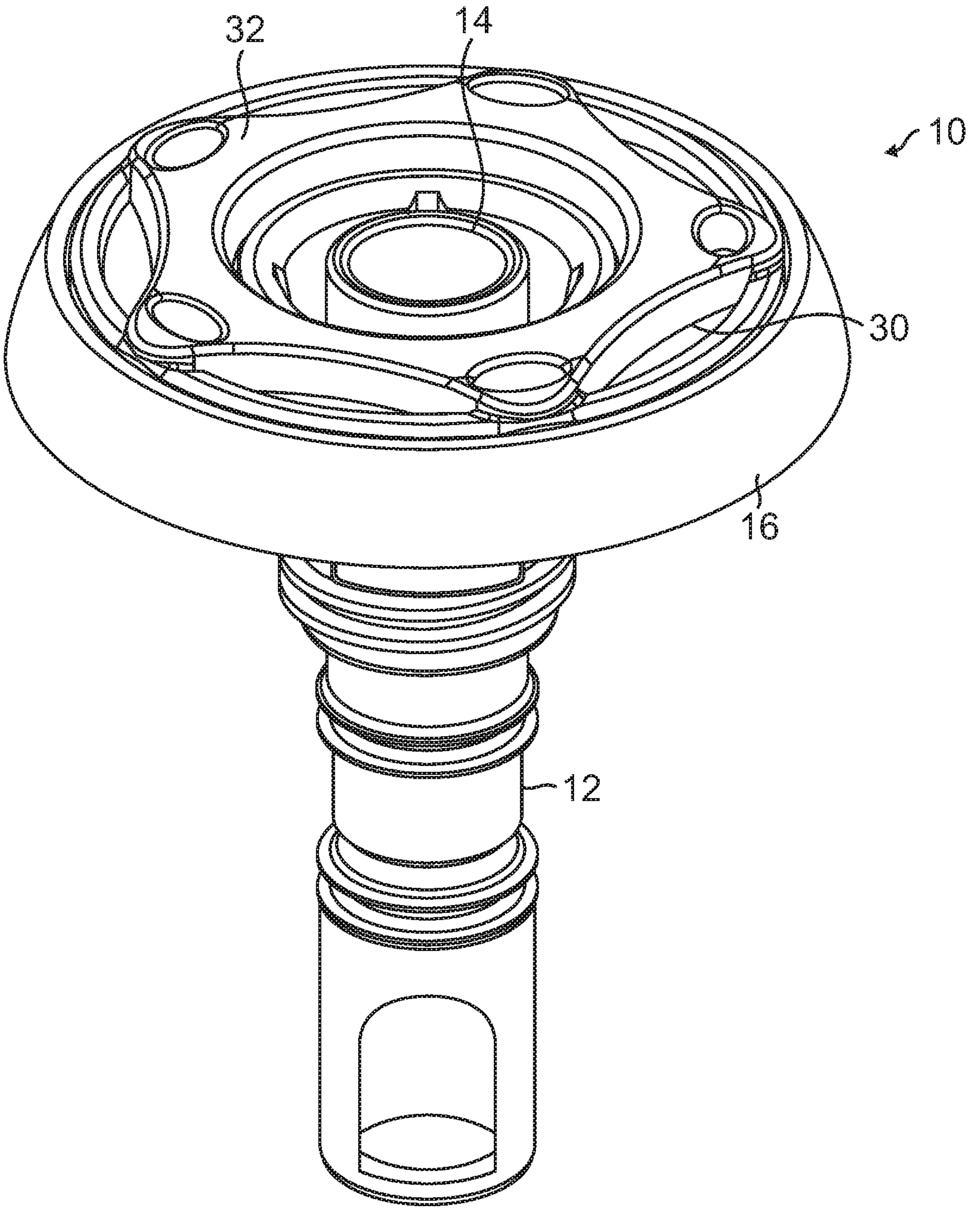
FIG. 8 is an unexploded view of the spa fitting shown in FIG. 5 with a different style of plastic cover.
Figure 9:
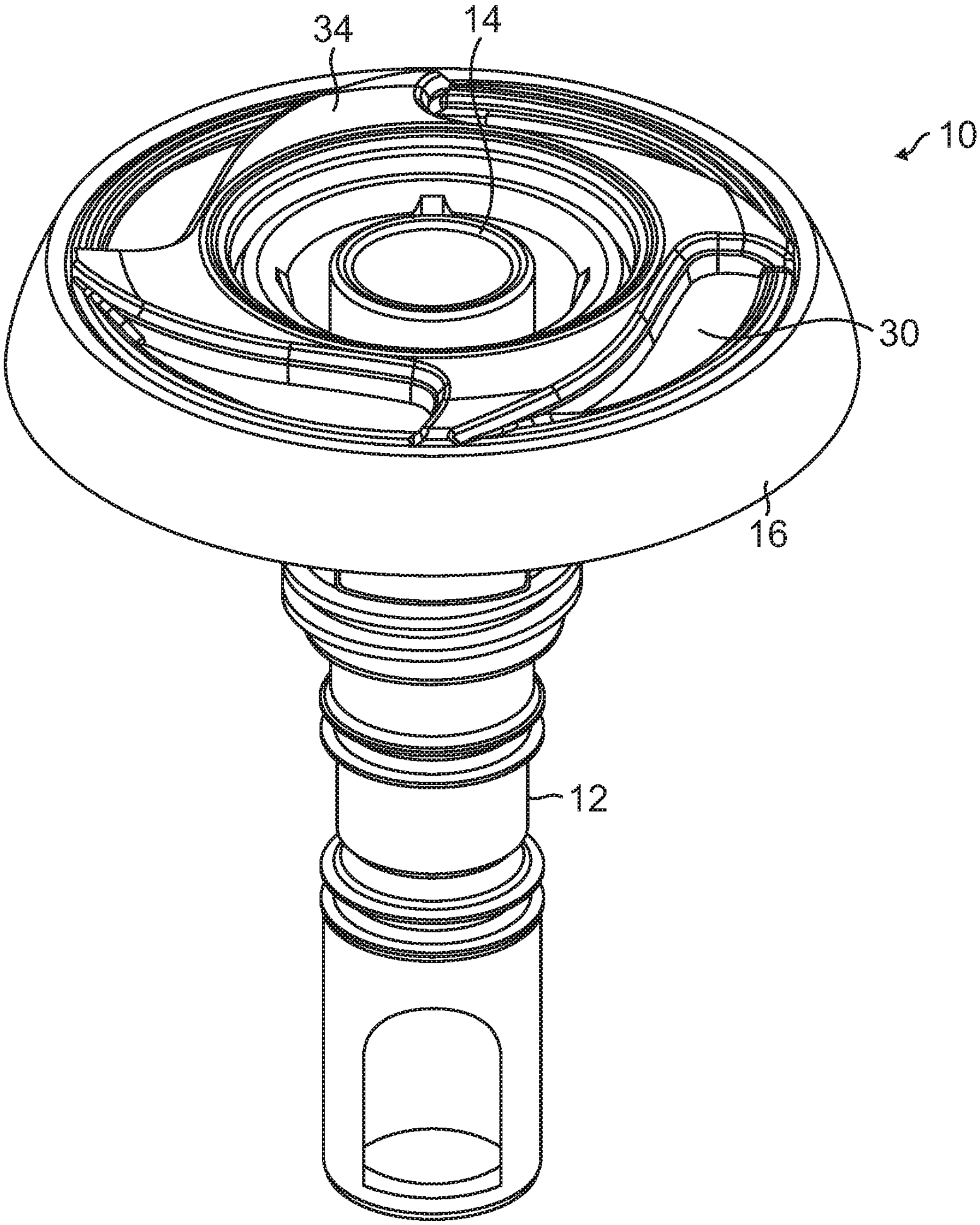
FIG. 9 is an unexploded view of the spa fitting shown in FIG. 5 with a different style of plastic cover.

FIG. 3 shows the unexploded fitting without any accent components or covers. Visible in FIG. 3 are seven attachment points 40A, 40B, 40C, 40D, 40D, 40E, 40F where the covers or covers and accent components can be attached. FIG. 4 shows the unexploded fitting 12 with a plastic cover 18 and no other accent component attached for a basic look. FIG. 5 shows the unexploded fitting 12 with one style of plastic cover 24 and a plastic or metal accent component 26 for a specific look. FIG. 6 shows the unexploded fitting 12 with a basic plastic cover 20 and a metal accent cover 22 for an alternate look. FIGS. 7-9 all show the same style of plastic or metal accent component 30 with different styles of plastic cover 28, 32, 34.

Specifically, as illustrated, FIG. 7 uses cover 28 with accent component 30, FIG. 8 uses cover 32 with accent component 30, and FIG. 9 uses cover 34 with accent component 30. As a contrast to the limited attachment points on the prior art show in FIGS. 10-11, FIGS. 12-18 show various top, bottom, isometric and cutaway views of small versions of the base 16S and large versions of the base 16L where the seven attachment points 40A, 40B, 40C, 40D, 40E, 40F are placed through clips 42A, 42B, 42C, 42D, 42E, 42F. The large number of attachment points 40A, 40B, 40C, 40D, 40E, 40F allow for increased versatility in the choices of covers and rings. Multiple apertures in the bases 16S, 16L provide two points 50 each at which the covers and rings can attach. As can be seen, the number of attachment points is not limited to those illustrated as further apertures could be included for more points.

Figure 18:
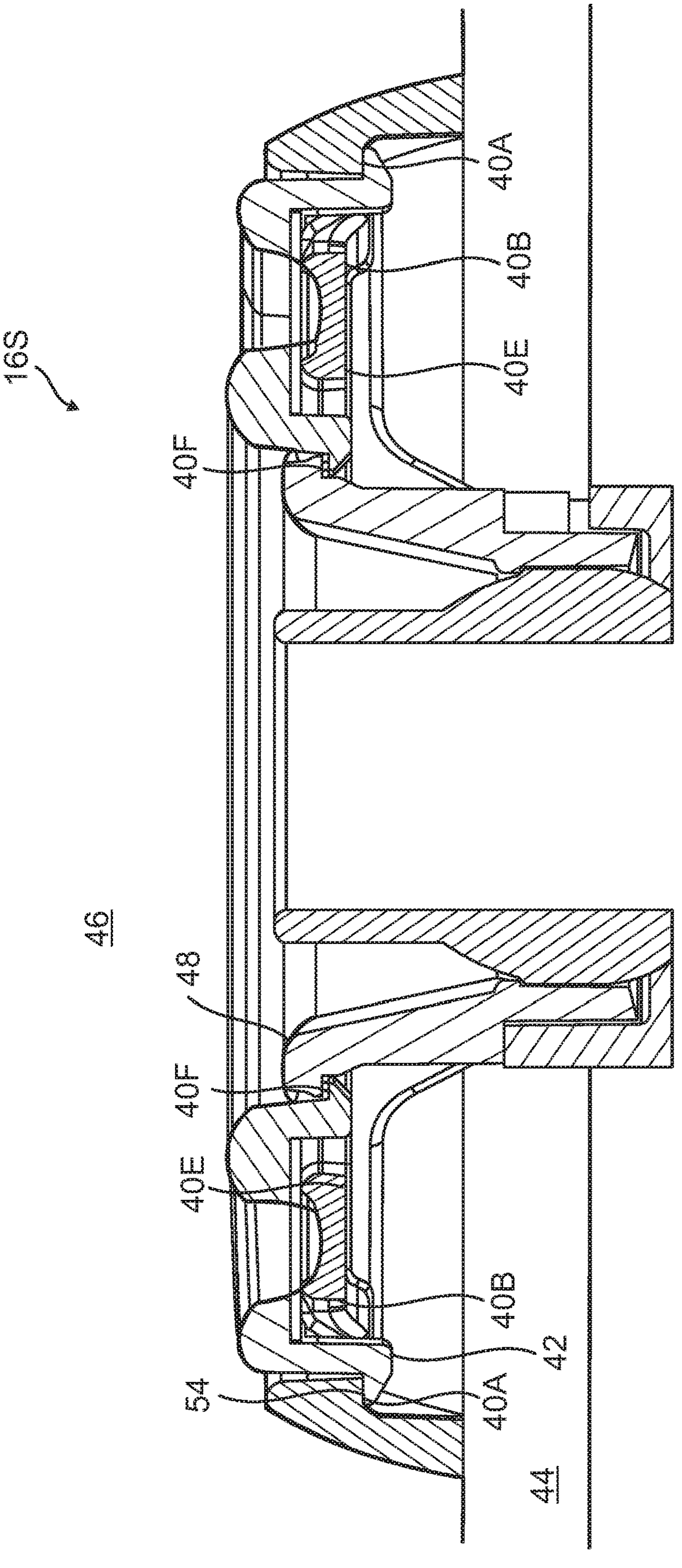
FIG. 18 is a side cutout view of the large base version of the common escutcheon base of the instant invention without any covers or accent components.

Cutout view in FIG. 18 shows a generic clip 42 which contacts contacting surface 54. The escutcheon contacting surface 48 is seen on the water side 46 of the spa wall 44.

The combinations of styles shown are exemplary only and do not show every possible combination of cover or cover and accent component/components for a specific look. A look or specific look may be chosen for various visual, lighting, tactile, ergonomic, branding, and safety reasons; as well as to achieve any number of desired results. The differing diameters of the common escutcheon base 16 provide for a variety of concentric connection points to which the covers and rings can be added in nearly limitless permutations.

An additional feature of the instant invention is the fact that plastic covers are injection molded in an injection mold without the need for any additional slides besides the single axis of movement needed for opening the mold by separating A and B plate for ejecting the injection molded plastic cover from the mold. Persons of ordinary skill in the art would be familiar with the process of injection molding, but a description of the process is provided below for context.

In the injection molding, the mold consists of two primary components, the injection mold (A plate) and the ejector mold (B plate). Plastic resin enters the mold through a sprue or gate in the injection mold; the sprue bushing is to seal tightly against the nozzle of the injection barrel of the molding machine and to allow molten plastic to flow from the barrel into the mold, also known as the cavity. The sprue bushing directs the molten plastic to the cavity images through channels that are machined into the faces of the A and B plates. These channels allow plastic to run along them, so they are referred to as runners. The molten plastic flows through the runner and enters one or more specialized gates and into the cavity geometry to form the desired part.

The amount of resin required to fill the sprue, runner and cavities of a mold comprises a “shot”. Trapped air in the mold can escape through air vents that are ground into the parting line of the mold, or around ejector pins and slides that are slightly smaller than the holes retaining them. If the trapped air is not allowed to escape, it is compressed by the pressure of the incoming material and squeezed into the corners of the cavity, where it prevents filling and can also cause other defects. The air can even become so compressed that it ignites and burns the surrounding plastic material.

To allow for removal of the molded part from the mold, the mold features must not overhang one another in the direction that the mold opens, unless parts of the mold are designed to move from between such overhangs when the mold opens using components called Lifters.

Sides of the part that appear parallel with the direction of draw (the axis of the cored position (hole) or insert is parallel to the up and down movement of the mold as it opens and closes) are typically angled slightly, called draft, to ease release of the part from the mold. Insufficient draft can cause deformation or damage. The draft required for mold release is primarily dependent on the depth of the cavity; the deeper the cavity, the more draft necessary. Shrinkage must also be taken into account when determining the draft required. If the skin is too thin, then the molded part tends to shrink onto the cores that form while cooling and cling to those cores, or the part may warp, twist, blister or crack when the cavity is pulled away.

A mold is usually designed so that the molded part reliably remains on the ejector (B) side of the mold when it opens, and draws the runner and the sprue out of the (A) side along with the parts. The part then falls freely when ejected from the (B) side. Tunnel gates, also known as submarine or mold gates, are located below the parting line or mold surface. An opening is machined into the surface of the mold on the parting line. The molded part is cut (by the mold) from the runner system on ejection from the mold. Ejector pins, also known as knockout pins, are circular pins placed in either half of the mold (usually the ejector half), which push the finished molded product, or runner system out of a mold. The ejection of the article using pins, sleeves, strippers, etc., may cause undesirable impressions or distortion, so care must be taken when designing the mold.

The standard method of cooling is passing a coolant (usually water) through a series of holes drilled through the mold plates and connected by hoses to form a continuous pathway. The coolant absorbs heat from the mold (which has absorbed heat from the hot plastic) and keeps the mold at a proper temperature to solidify the plastic at the most efficient rate.

To ease maintenance and venting, cavities and cores are divided into pieces, called inserts, and sub-assemblies, also called inserts, blocks, or chase blocks. By substituting interchangeable inserts, one mold may make several variations of the same part.

More complex parts are formed using more complex molds. These may have sections called slides, that move into a cavity perpendicular to the draw direction, to form overhanging part features. When the mold is opened, the slides are pulled away from the plastic part by using stationary “angle pins” on the stationary mold half. These pins enter a slot in the slides and cause the slides to move backward when the moving half of the mold opens. The part is then ejected and the mold closes. The closing action of the mold causes the slides to move forward along the angle pins.

A mold can produce several copies of the same parts in a single “shot”. The number of “impressions” in the mold of that part is often incorrectly referred to as cavitation. A tool with one impression is often called a single impression (cavity) mold. A mold with two or more cavities of the same parts is usually called a multiple impression (cavity) mold. Some extremely high production volume molds (like those for bottle caps) can have over 128 cavities.

In some cases, multiple cavity tooling molds a series of different parts in the same tool. Some toolmakers call these molds family molds, as all the parts are related—e.g., plastic model kits.

Some molds allow previously molded parts to be reinserted to allow a new plastic layer to form around the first part. This is often referred to as over molding. This system can allow for production of one-piece tires and wheels.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A system that provides for the selection of appearances for the inside of a pool or spa wall comprising:

a fitting that fits into an aperture on the interior wall of a spa or pool;

an escutcheon base that is arcuate with a certain diameter for attachment to said fitting, said escutcheon base further comprising:

three or more concentric members; and a set of two or more apertures situated along each of said three or more concentric members wherein said three or more concentric members and said three or more sets of two or more apertures located within an outer boundary of said escutcheon base provide multiple and variable attachment points on said escutcheon base;

a selection of plastic covers that are attachable to said variable attachment points; and a selection of accent components that are capturable between one of said selection of covers and said escutcheon base wherein a cover or a cover and one or more accent components are chosen for attachment to said escutcheon base to thereby provide a specific look on the inside of said pool or spa wall.

2. The system as defined in claim 1 wherein a selection of accent components that are capturable between one of said selection of covers and said escutcheon base said selection of accent components includes accent components made of plastic.

3. The system as defined in claim 1 wherein said selection of accent components includes accent components made of metal.

4. The system as defined in claim 1 wherein said fitting is a hydrotherapy jet.

5. The system as defined in claim 4 wherein said cover is moldable from an injection mold that does not require slides or lifters.

6. The system as defined in claim 1 wherein said cover is moldable from an injection mold that does not require slides or lifters.

7. A system that provides for the selection of appearances for the inside of a pool or spa wall comprising:

a fitting that fits into an aperture on the interior wall of a spa or pool;

an escutcheon base that is arcuate with a certain diameter for attachment to said fitting, said escutcheon base further comprising:

two or more concentric members; and a set of two or more apertures situated along each of said two or more concentric members wherein said two or more concentric members and said two or more sets of two or more apertures located within an outer boundary of said escutcheon base provide multiple and variable attachment points on said escutcheon base forward of the water side of the pool or spa wall;

wherein a cover is chosen for attachment to said escutcheon base to thereby provide a specific look on the inside of said pool or spa wall.

8. The system as defined in claim 7 further comprising a selection of plastic covers that are attachable to said variable attachment points and a selection of accent components that are capturable between one of said selection of covers and said escutcheon base.

9. The system as defined in claim 7 wherein said fitting is a hydrotherapy jet.

10. The system as defined in claim 9 wherein said selection of plastic covers is moldable from an injection mold that does not require slides or lifters.

11. The system as defined in claim 7 wherein said selection of plastic covers is moldable from an injection mold that does not require slides or lifters.

12. A system that provides for the selection of appearances for the inside of a pool or spa wall comprising:

a fitting that fits into an aperture on the interior wall of a spa or pool;

an escutcheon base that is arcuate with a certain diameter for attachment to said fitting, said escutcheon base further comprising:

three or more concentric members; and a set of two or more apertures situated along each of said three or more concentric members wherein said three or more concentric members and said three or more sets of two or more apertures located within an outer boundary of said escutcheon base provide multiple and variable attachment points on said escutcheon base forward of the water side of the pool or spa wall;

a selection of plastic covers that are attachable to said variable attachment points; and a selection of accent components that are capturable between one of said selection of covers and said escutcheon base wherein a cover or a cover and one or more accent components are chosen for attachment to said escutcheon base to thereby provide a specific look on the inside of said pool or spa wall.

13. The system as defined in claim 12 wherein a selection of accent components that are capturable between one of said selection of covers and said escutcheon base said selection of accent components includes accent components made of plastic.

14. The system as defined in claim 12 wherein said selection of accent components includes accent components made of metal.

15. The system as defined in claim 12 wherein said fitting is a hydrotherapy jet.

16. The system as defined in claim 15 wherein said cover is moldable from an injection mold that does not require slides or lifters.

17. The system as defined in claim 12 wherein said cover is moldable from an injection mold that does not require slides or lifters.

* * * * *